(12) United States Patent
Kim

(10) Patent No.: US 6,349,167 B1
(45) Date of Patent: Feb. 19, 2002

(54) OPTICAL DISC REPRODUCING APPARATUS AND METHOD

(75) Inventor: Young-Chul Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/003,330

(22) Filed: Jan. 6, 1998

(30) Foreign Application Priority Data

Jan. 16, 1997 (KR) .............................................. 97-112

(51) Int. Cl.[7] .................................................. H04N 5/52
(52) U.S. Cl. .......................... 386/98; 386/111; 386/125
(58) Field of Search .............................. 386/1, 45, 46, 386/95, 125, 126, 98, 111, 112; 345/430, 431

(56) References Cited

U.S. PATENT DOCUMENTS 5,895,124 A * 4/1999 Tsuga et al. ................. 386/126
5,915,067 A * 6/1999 Nonomura et al. .......... 386/126
6,208,350 B1 * 3/2001 Herrera ....................... 345/430

* cited by examiner

Primary Examiner—Wendy R. Garber
Assistant Examiner—Christopher Onuaku
(74) Attorney, Agent, or Firm—Birch, Stewart, Kolasch & Birch, LLP

(57) ABSTRACT

The optical disc reproducing apparatus includes an optical pick-up, a video decoder and a graphics circuit. The optical pick-up reproduces a signal from an optical disc wherein the reproduced signal includes at least video data and sub-picture data. The video decoder decodes the video data in the reproduced signal. The graphics circuit stores a plurality of text portions, and receives the reproduced signal and character control instructions. The graphics circuit generates first character data representing at least one of the plurality of text portions based on the character control instructions, and generates second character data based on the sub-picture data in the reproduced signal. A digital video signal is then generated by mixing the first and second character data and the decoded video data.

35 Claims, 5 Drawing Sheets

OPTICAL DISC REPRODUCING APPARATUS AND METHOD

BACKGROUND OF THE INVENTION

1. Field of the Invention

The present invention relates to an optical disc reproducing apparatus and method, and more particularly to an optical disc reproducing apparatus for displaying text such as caption data, program menu data, reproduction information, etc., on a display screen using a single character generating device.

2. Description of Related Art

A greater demand exits in the industry for techniques which allow large amounts of information to be densely recorded upon recording media. Development has focused on recording media such as compact discs, digital video discs (DVD), etc., to meet this need.

A DVD reproducing apparatus has been designed to reproduce data recorded on a DVD (diameter: 12 cm, thickness: 1.2 mm) for about 135 minutes, and to provide better image and sound quality than a laser disc. Accordingly, a DVD device is one of the noticeable multimedia devices in audio/video and computer applications. DVDs are widely used in image processing applications due to their large storage capacity. One of the DVD system formats has system specifications as follows:

1. Maximum 9 camera angles reproducible;
2. Maximum 8 channels for audio and 32 languages as a caption;
3. Storage of a plurality of user selectable programs, selectable via a menu screen; and
4. Provision of parental lock function which can prevent children from watching adult programs.

According to the above system specification, the structure of the data stream used in DVDs is shown in FIG. 1. This data stream includes a video stream, an audio stream, and a sub-picture stream. Although not shown, the data stream also includes control data which is used during reproduction to control the reproducing operation. The video stream includes video or image data such as for a moving image, the audio stream includes audio data such as voice and/or sound data, and the sub-picture stream includes caption data to be displayed on a display screen during reproduction. As also shown in FIG. 1, the audio data includes multiple channels.

A conventional optical disc reproducing apparatus using the above-described data stream structure will be described with reference to FIG. 2. As shown in FIG. 2, the optical disc reproducing apparatus for reproducing data from an optical disc 1 includes a motor 11 for rotating the optical disc 1; an optical pick-up 3 for reading the data recorded on the optical disc 1; a servo circuit 13 for generating drive signals to control the operation of the motor 11 and the optical pick-up 3; and microprocessor 15 for controlling the operation of the servo circuit 13, a signal processing circuit 5, an error correction circuit 7, a navigator 17, and an on screen display (OSD) unit 31 based on key input from a user.

In accordance with the instructions received from the microprocessor 15, the signal processing circuit 5 amplifies the reproduced signal output from the optical pick-up 3, and performs phase compensation thereon. The microprocessor 15 also obtains management and sub-management data from the reproduced signal processed by the signal processing circuit 5. The management data includes table of contents (TOC) data such as recorded in the lead-in area of the optical disk 1. The sub-management data includes characteristic information for the data recorded on the optical disk such as recorded in the headers of logically grouped data. With respect to a DVD, the characteristic information could indicate which camera angle from the plurality of camera angles the data in the following logical group represents, or could indicate that the data in the following logical group is English language caption data.

The error correction circuit 7 corrects, under the control of the microprocessor 15, errors in the bit stream of the reproduced signal output by the signal processing circuit 5. A variable transfer rate (VBR) buffer 9 temporarily stores the error corrected reproduced signal. The navigator 17 controls the transfer of data from the VBR buffer 9 to a data decoding section 30 in part based on control signals from the microprocessor 15 and in part based on the control data extracted from the bit stream of the reproduction signal output from the VBR buffer 9.

The data decoding section 30 includes a video decoding part 21, a graphics circuit 24, and an audio decoding part 27 operating under the control of the navigator 17. The graphics circuit 24 receives the output of the VBR buffer 9 via the video decoding part 21, and the audio decoding part 27 receives the output of the VBR buffer 9 via the graphics circuit 24 and the video decoding part 21.

A mixer 43 mixes the output of the video decoding part 21 and the graphics circuit 24 to produce a digital video signal. A first digital/analog converter 23 digital-to-analog converts the digital video signal, while a second digital/analog converter 29 digital-to-analog converts the output of the audio decoding part 27.

The OSD unit 31, under the control of the microprocessor 15, adds character data representing reproduction information to the analog video signal output by the first digital/analog converter 23 to produce an output video signal.

Next, the operation of the conventional optical disc reproducing apparatus will be described. After mounting the optical disc 1 on a turntable (not shown), the user selects a specific system function and options associated therewith using a plurality of input keys (not shown). For instance, after selecting a basic reproduction operation, the user can select the reproduction characteristics. The reproduction characteristics include, for example, the camera angle to be reproduced, that a caption should be displayed, and the language of the caption. If the user does not elect to select the reproduction characteristics, then the basic reproduction operation will proceed according to predetermined default reproduction characteristics.

When the user selects a reproduction operation, the microprocessor 15 controls the servo circuit 13 to drive the motor 11 and the optical pick-up 3. According to the drive signals from the servo circuit 13, the optical pick-up 3 reproduces data recorded on the optical disc 1. The reproduced data is converted into an electrical signal and output to the signal processing circuit 5. The signal processing circuit 5 performs a predetermined signal processing operation such as noise amplification, phase compensation, etc., on the electrical signal (i.e., the reproduced signal) in accordance with the instructions received from the microprocessor 15, and the microprocessor 15 extracts the management and sub-management data from the processed reproduced signal.

The processed reproduced signal is output to the error correction circuit 7. The error correction circuit 7 corrects errors generated in the reproduced signal in a predetermined manner as instructed by the microprocessor 15. The error corrected reproduced signal is then output to and temporarily stored by the VBR buffer 9. Based on the reproduction characteristics and the management and sub-management data, the navigator 17 controls the transfer of data from the VBR buffer 9 to the data decoding section 30. Because frames of video data are compressed to different sizes according to the characteristics of the images in the frame, the quantity of data input by the VBR buffer 9 varies. In order to store variably transferred data, yet output a continuous and seamless stream of data, the VBR buffer 9, under the control of the navigator 17, is used.

As discussed above with respect to FIG. 1, the data output from the VBR buffer 9 includes system related control data, video data, sub-picture data, (e.g, caption and menu selection data), and audio data. The navigator 17 extracts the control data, and controls the operation of the data decoding section based in part thereon.

The data output from the VBR buffer 9 is received by the video decoding part 21 of the data decoding section 30. The video decoding part 21 extracts, decompresses, and decodes the video data in the bit stream output from the VBR buffer 9 under the control of the navigator 17. The video decoding part 21 then outputs the processed video data to the mixer 43. The video decoding part 21 also passes the bit stream from the VBR buffer 9 to the graphics circuit 24.

The graphics circuit 24 extracts and decodes the sub-picture data in the bit stream from the VBR buffer 9, and outputs the decoded sub-picture data to the mixer 43. FIG. 3 is a detailed block diagram of the conventional graphics circuit 24. As shown in FIG. 3, the graphics circuit 24 includes a data extracting part 33 for extracting the sub-picture data in the bit stream output from the VBR buffer 9. A timing circuit 35 also receives the bit stream output by the VBR buffer 9, and detects a sync signal from the video data included in the bit stream. Based on the detected sync signal, the timing circuit 25 generates a clock signal.

The graphics circuit 24 further includes a decoder 37 and a first character memory 39. The decoder 37 receives the sub-picture data output by the data extracting part 33, and decodes the sub-picture data. The decoded sub-picture data is then stored in the first character memory 39. In accordance with the clock signal output by the timing circuit 35, the first character memory 39 outputs the decoded sub-picture data for display at a predetermined position on the display screen. The decoded sub-picture data output by the first character memory 39 is amplified by a level controller 41, and output to the mixer 43. The mixer 43 mixes the processed video data output by the video decoding part 21 with the amplified decoded sub-picture data to produce a digital video signal.

As shown in FIG. 2, the first digital/analog converter 23 converts the digital video signal output by the mixer 43 into an analog video signal. The OSD unit 31 receives the analog video signal, and mixes a character signal with the analog video signal under the control of the microprocessor 15.

FIG. 4 is a detailed block diagram of the conventional OSD unit 31. As shown in FIG. 4, a timing circuit 45 receives the analog video signal, detects a sync signal in the video signal portion of the analog video signal, and generates a clock signal according to the detected sync signal and instructions from a controller 47. The controller 47 receives clock data and character control instructions from the microprocessor 15. The clock data indicates when the clock signal should be output from the timing circuit 45. In accordance with the clock data, the controller 47 outputs instructions to the timing circuit 45. The controller 47 also converts the character control instructions into memory addresses, and outputs the memory addresses to a second character memory 49. The second character memory 49 stores the text of, for example, reproduction information such as time information and operation information (e.g., play, rewind, fast forward, camera angle, etc.). The character control instructions specify the reproduction information the second character memory 49 is to output.

Based on the clock signal, the second character memory 49 outputs the text or character data addressed by the memory addresses from the controller 47 to a level controller 51. Accordingly, the clock signal (i.e., the clock data from the microprocessor 15) specifies the position on the display where this character data will appear. The level controller 51 amplifies the character data output from the second character memory 49, and converts the amplified data into an analog character signal. This analog character signal is then mixed by a mixer 53 with the analog video signal output from the mixer 43 to produce an output video signal.

As shown in FIG. 3, the bit stream output by the VBR buffer 9 is transferred from the video decoding part 21 and the graphics circuit 24 to the audio decoding part 27. Based on instructions from the navigator 17, the audio decoding part 27 extracts and decodes the audio data in this bit stream. The second analog converter 29 converts the audio data into an output audio signal.

As discussed above, both the graphics circuit 24 and the OSD unit 31 output data, which is mixed with video data, to display text on a display screen. As such, elements forming the graphics circuit 24 are duplicated in the OSD unit 31. As a result, the conventional optical disc reproducing apparatus is large, complex, and costly.

Furthermore, the video data in the bit stream output by the VBR buffer 9 undergoes several processes (e.g., extraction, decoding, conversion, mixing). Each signal processing procedure degrades the signal-to-noise ratio of the resulting output video signal such that image quality is deteriorated and the display of characters can become distorted.

SUMMARY OF THE INVENTION

One object of the present invention is to provide an optical disc reproducing apparatus and method which overcome the problems and disadvantages discussed above.

Another object of the present invention is to provide an optical disc reproducing apparatus which is smaller, less complex, and less costly than conventional optical reproducing apparatuses.

A further object of the present invention is to provide an optical disc reproducing apparatus which uses a single character generating device to display sub-picture data and reproduction information.

Another object of the present invention is to provide an optical disc reproducing apparatus which digitally processes sub-picture data and reproduction information to be displayed on a display screen.

These and other objectives are achieved by providing an optical disc reproducing apparatus, comprising: an optical pick-up for reproducing a digital signal from an optical disc, said reproduced digital signal including at least video data and sub-picture data; and processing means for storing a plurality of text portions, for receiving character control instructions, for receiving said reproduced digital signal, for generating first character data representing at least one of said plurality of text portions based on said character control instructions, for generating second character data based on said sub-picture data in said reproduced digital signal, and for generating a digital video signal based on said first and second character data and said video data in said reproduced digital signal.

These and other objectives are further achieved by providing an optical disc reproducing apparatus, comprising: an optical pick-up for reproducing a signal from an optical disc, said reproduced signal including at least video data and sub-picture data; a video decoder decoding said video data in said reproduced signal; and a graphics circuit storing a plurality of text portions, receiving character control instructions, receiving said reproduced signal, generating first character data representing at least one of said plurality of text portions based on said character control instructions, and generating second character data based on said sub-picture data in said reproduced signal.

These and other objectives are also achieved by providing an optical disc reproducing method, comprising: reproducing a digital signal from an optical disc, said reproduced digital signal including at least video data and sub-picture data; storing a plurality of text portions; receiving character control instructions; generating first and second character data based on said character control instructions and said sub-picture data in said reproduced digital video signal, said first character data representing at least one of said plurality of text portions; and generating a digital video signal based on said first and second character data and said video data.

These and other objectives are additionally achieved by providing an optical disc reproducing apparatus, comprising: an optical pick-up for reproducing a signal from an optical disc, said reproduced signal including at least video data and sub-picture data; and processing means for storing a plurality of text portions in a single memory, for receiving character control instructions, for receiving said reproduced digital signal, for generating, using said single memory, first character data representing at least one of said plurality of text portions based on said character control instructions, and for generating, using said single memory, second character data based on said sub-picture data in said reproduced signal.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
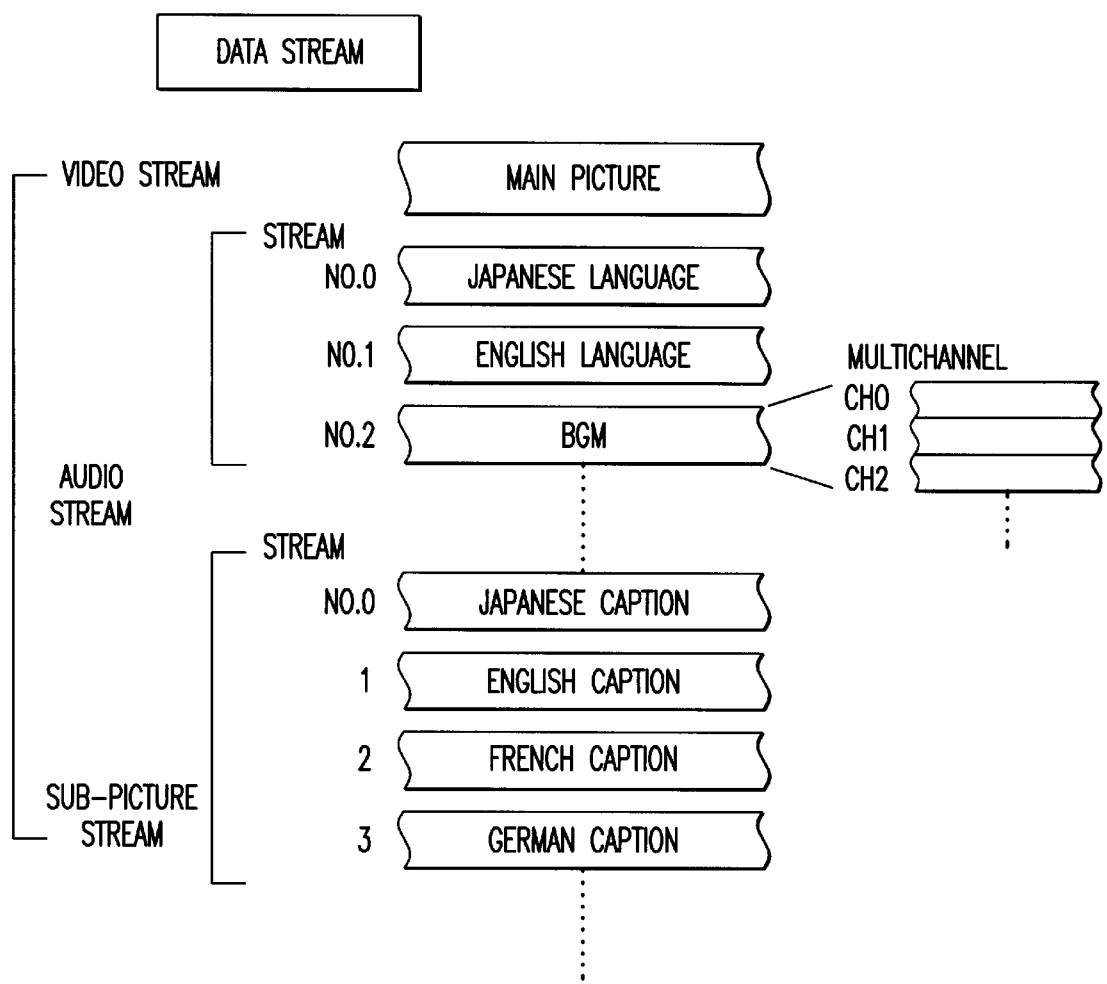
FIG. 1 shows the structure of a data stream in a DVD.
Figure 2:
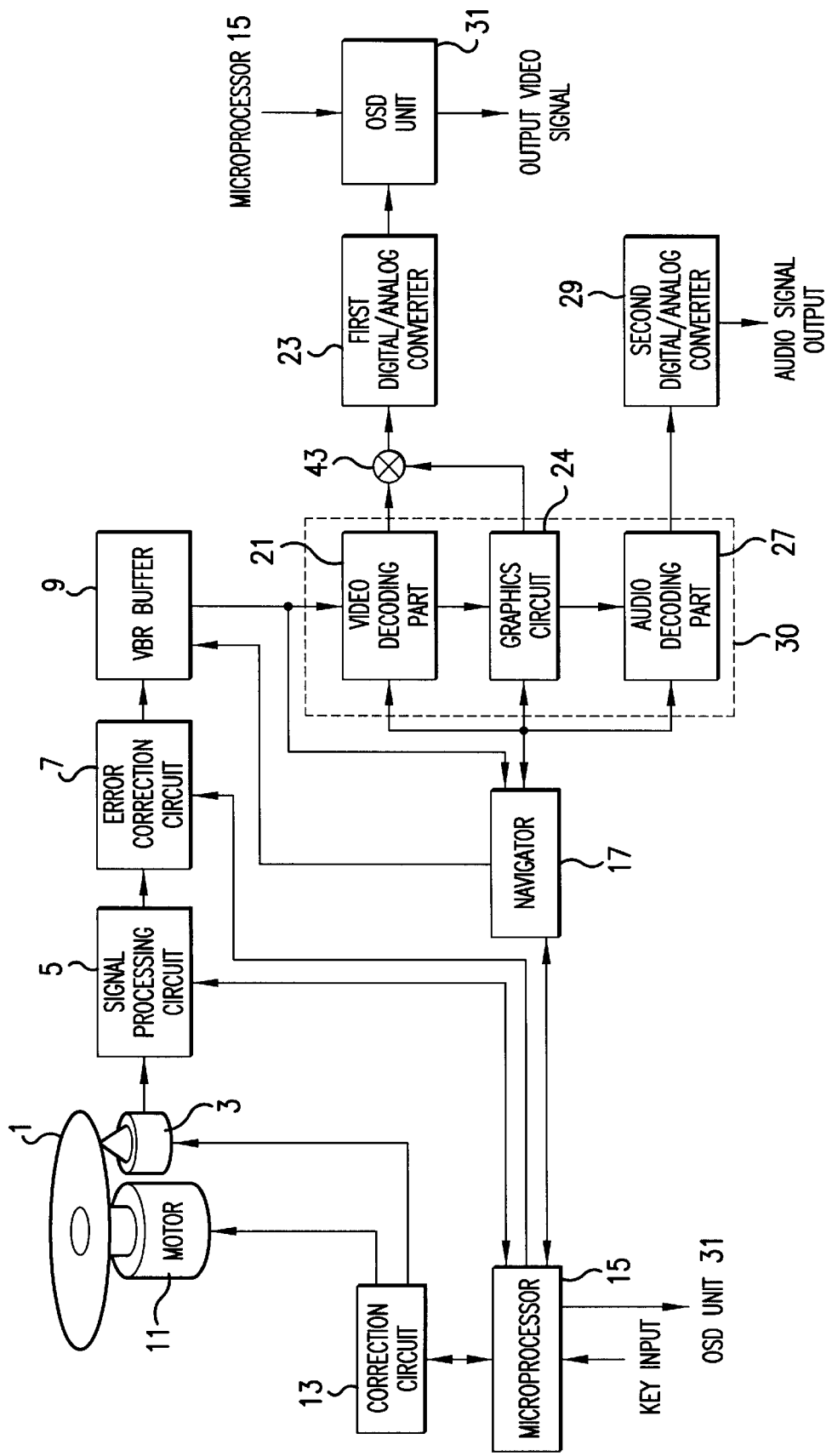
FIG. 2 is a schematic block diagram of a conventional optical disc reproducing apparatus.
Figure 3:
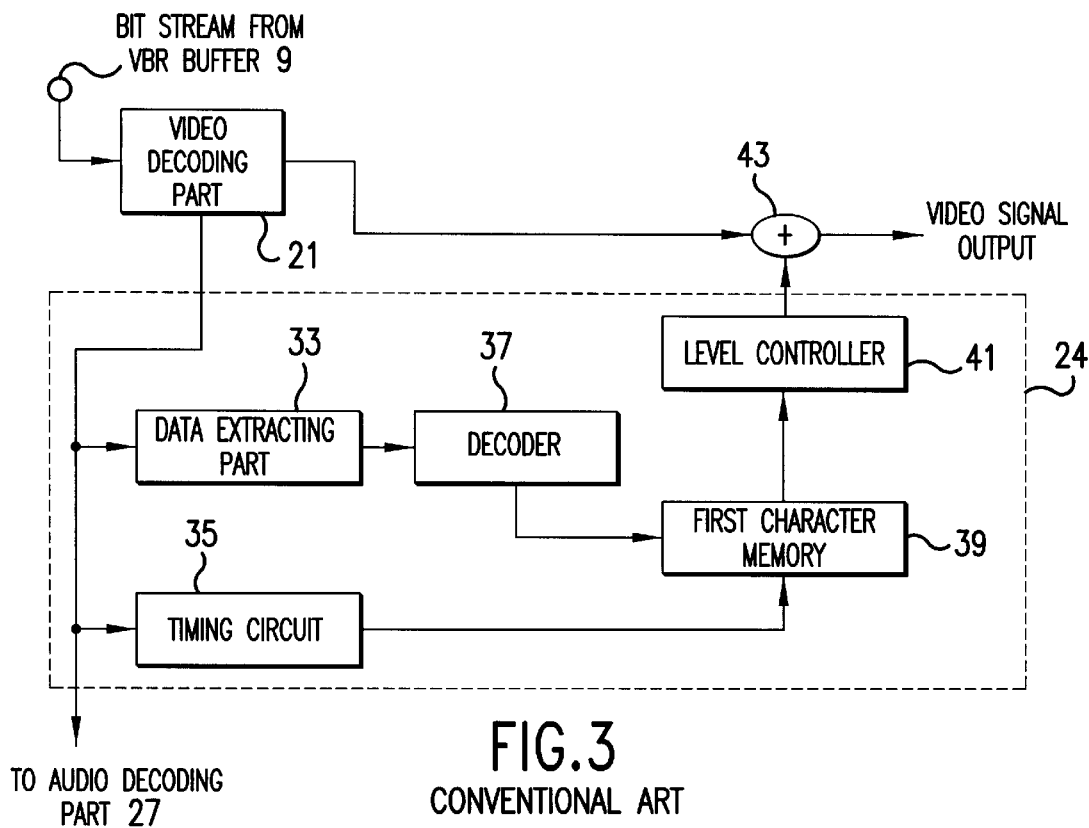
FIG. 3 is a detailed block diagram of the graphics circuit shown in FIG. 2.
Figure 4:
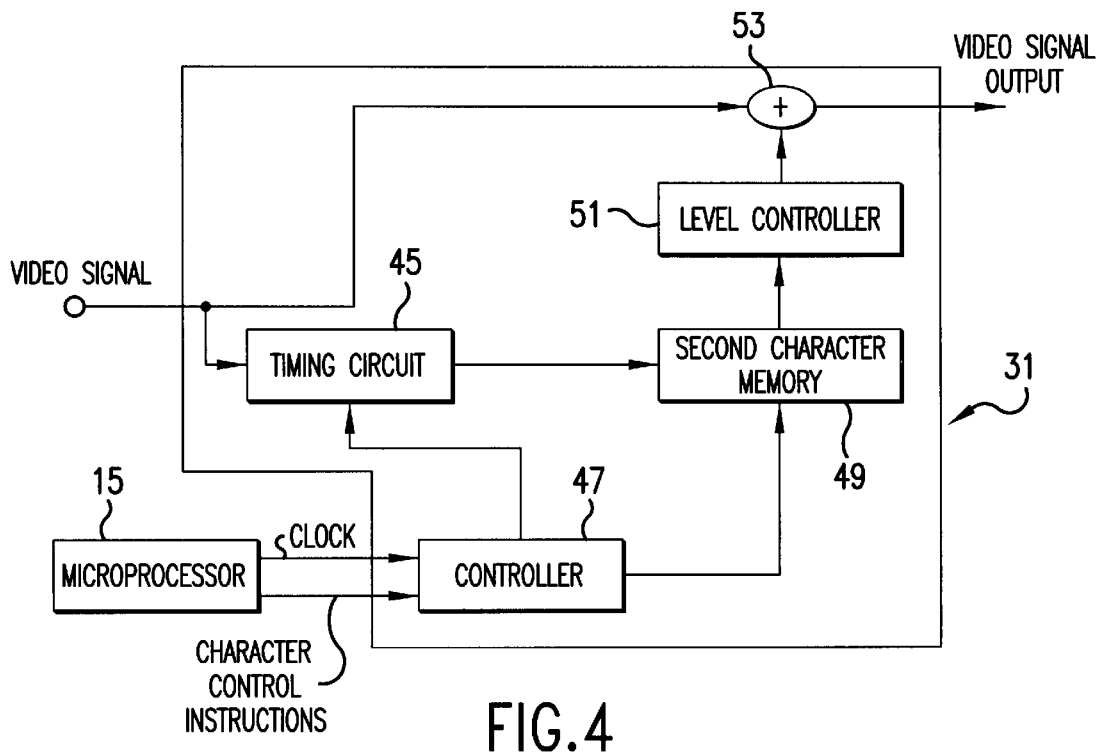
FIG. 4 is a detailed block diagram of the OSD unit shown in FIG. 2.
Figure 5:
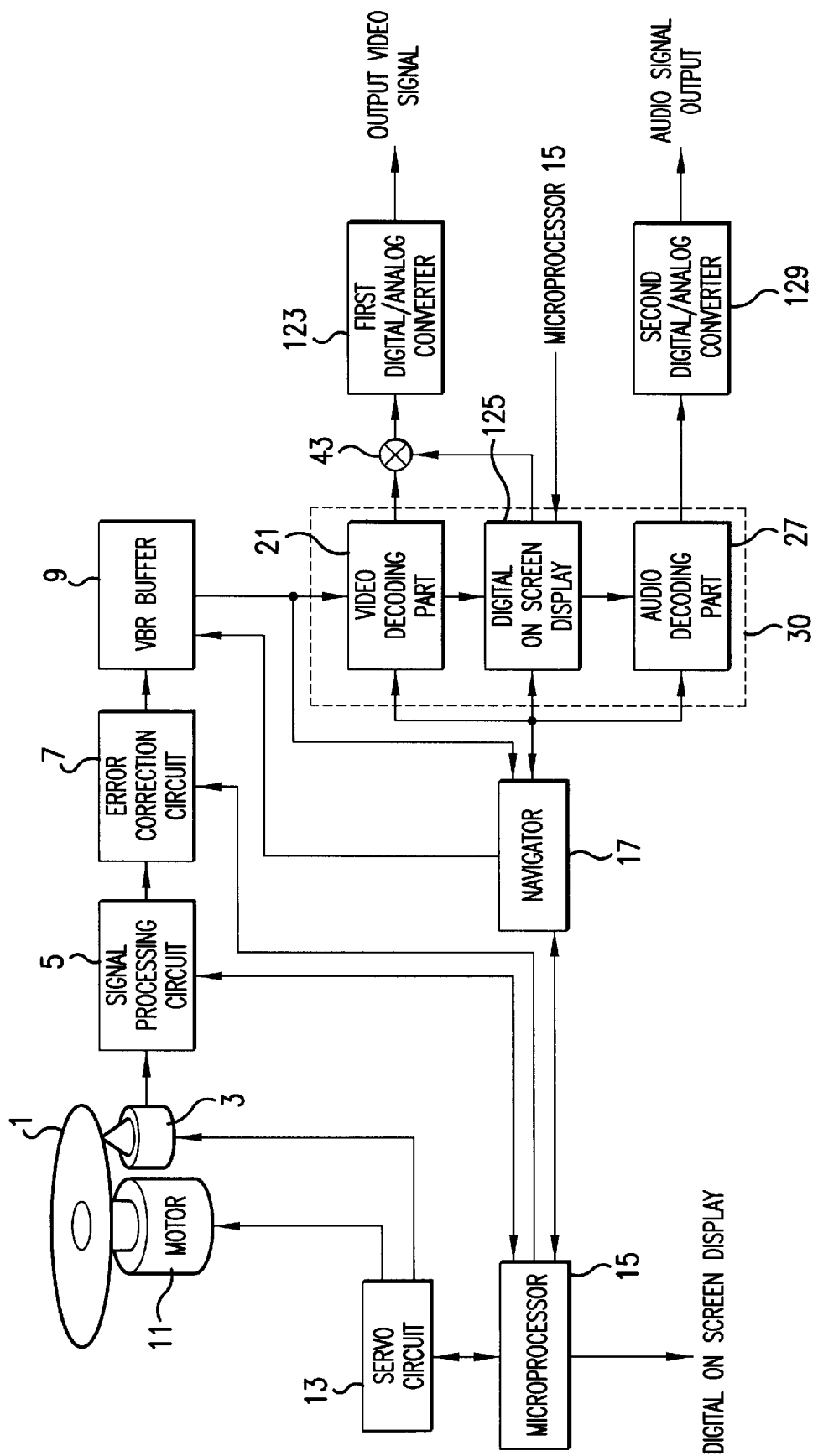
FIG. 5 is a schematic block diagram of an optical disc reproducing apparatus according to the present invention.

As shown in FIG. 5, the optical disc reproducing apparatus according to the present invention is the same as the conventional optical disc apparatus shown in FIG. 2 except that the graphics circuit 24 has been replaced by a digital OSD unit 125 and no OSD unit is connected to the output of the first digital/analog converter 23. In view of the foregoing, only the differences between the present invention and the conventional art will be discussed.

Figure 6:
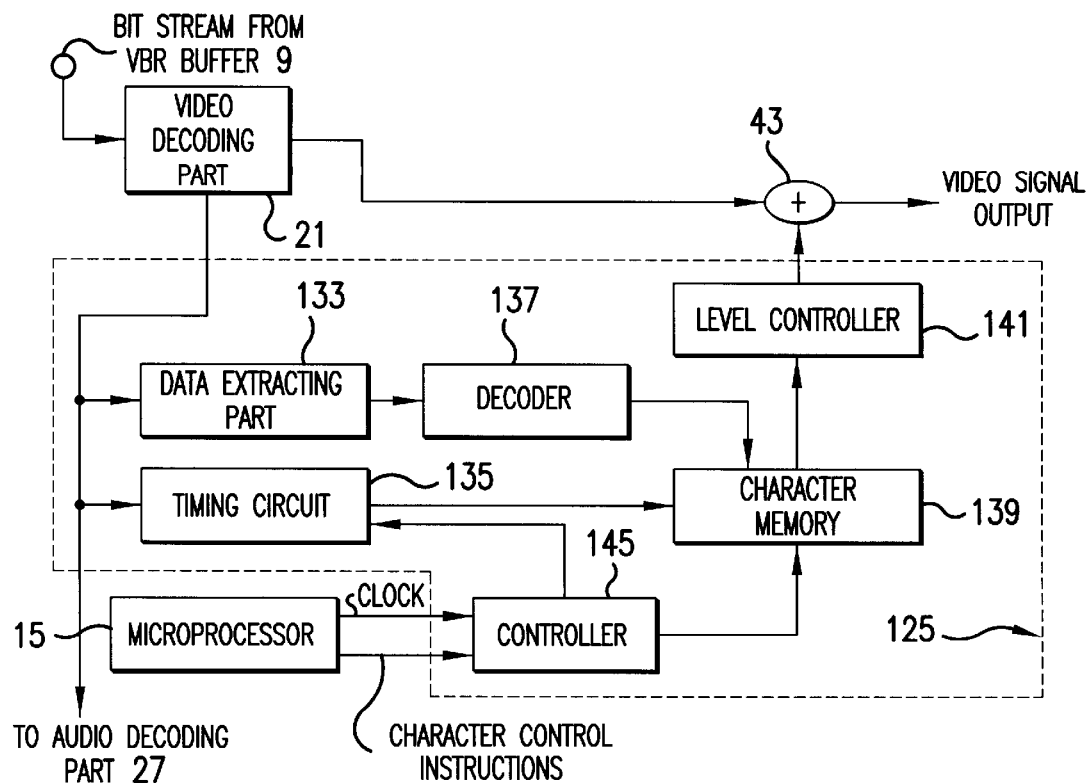
FIG. 6 is a detailed block diagram of the digital OSD unit shown in FIG. 5.

FIG. 6 illustrates one embodiment of the digital OSD unit 125. As shown in FIG. 6, the digital OSD unit 125 includes a single character memory 139 connected to a timing circuit 135, a decoder 137, a level controller 141, and a controller 145. The character memory 139 includes a first and second portion (not shown). The first portion of the character memory 139 is, for example, a random access memory RAM, while the second portion of the character memory 139 is, for example, a read only memory ROM. The second portion of the character memory 139 stores the text of, for example, reproduction information such as time information and operation information (e.g., play, rewind, fast forward, camera angle, etc.) at predetermined memory addresses.

As further shown, a data extracting part 133 receives the bit stream output by the VBR buffer 9 from the video decoding part 21, and sends output to the decoder 137. The controller 145 receives the clock data and the character control instructions from the microprocessor 15, and sends output to the timing circuit 135 and the character memory 139.

The level controller 141 amplifies the character data received from the character memory 139, and sends the amplified character data to the mixer 43. As also shown in FIG. 6, the digital OSD unit 125 transfers the bit stream output from the VBR buffer 9 to the audio decoding part 27.

The operation of the digital OSD unit 125 shown in FIG. 6 will now be described. The data extracting part 133 extracts the sub-picture data in the bit stream output from the VBR buffer 9. The sub-picture data includes menu selection data (e.g., camera angle selection, audio and language selection, etc.), caption data, etc. The decoder 137 decodes this sub-picture data, and the decoded sub-picture data is stored in the first portion of the character memory 139.

The controller 145 receives clock data and character control instructions from the microprocessor 15. The controller 145 converts the character control instructions into memory addresses of reproduction information stored in the character memory 139, and outputs the memory addresses to the character memory 139. Based on the clock data, the controller 145 generates timing instructions, and outputs these timing instructions to the timing circuit 135. The timing circuit 135 detects the sync signal from the video data in the bit stream output from the VBR buffer 9, and based on the timing instructions and the sync signal, generates a clock signal.

In accordance with the clock signal, the character memory 139 outputs the decoded sub-picture data as first character data. In accordance with the clock signal and the memory addresses, the character memory 139 outputs the addressed reproduction information as second character data.

The first character data output from the character memory 139 represents the text of a caption and/or menu selection, and the position of this caption and/or menu selection on the display screen is predetermined with respect to the sync signal. The second character data output by the character memory 139 represents the text of reproduction information, and is positioned on the display screen in accordance with the timing instructions output by the controller 145 to the timing circuit 135.

The character data output of the character memory 139 is amplified by the level controller 141. The mixer 43 mixes the amplified character data with the processed video signal output by the video decoding part 21 to generate a digital video signal. Also, the bit stream output from the VBR buffer 9 is transferred to the audio decoding part 27.

Unlike the conventional optical disc reproducing apparatus, the optical disc reproducing apparatus according to the present invention, which incorporates the digital OSD unit 125, includes a single character generating device for both the sub-picture data and the reproduction information. Because a single extracting, decoding, and mixing operation are performed, the signal-to-noise ratio is improved compared to the conventional optical disc reproducing apparatuses. Furthermore, the processing performed by the OSD unit 125 takes place entirely in the digital domain. This further benefits the signal-to-noise ratio by eliminating the number of digital-to-analog conversions to produce an output video signal.

Figure 7:
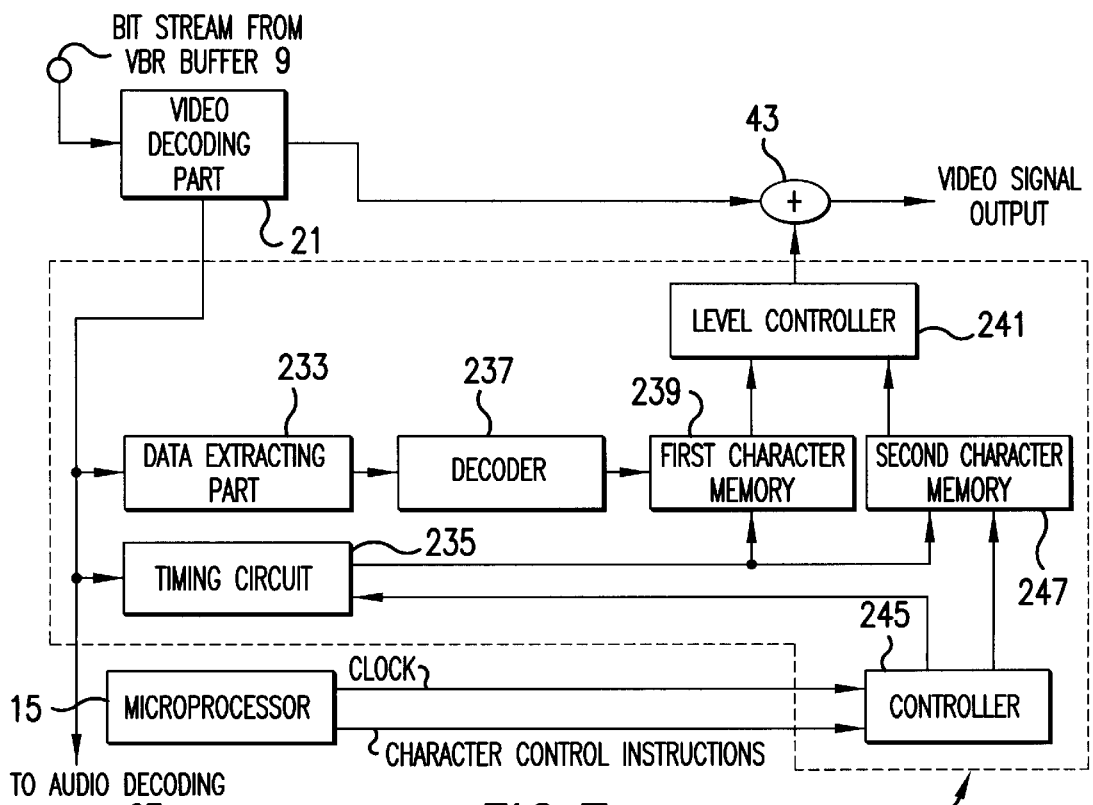
FIG. 7 is a detailed block diagram of another embodiment of the digital OSD unit shown in FIG. 5

Another embodiment of the digital OSD unit 125 is illustrated in FIG. 7. As shown in FIG. 7, the digital OSD unit 125 includes a first character memory 239 and a second character memory 247. The first character memory 239 is connected to a timing circuit 235, a decoder 237, and a level controller 241. The first character memory 239 is, for example, a RAM. The second character memory 247 is connected to the timing circuit 235, the level controller 241, and a controller 245. The second character memory 247 is, for example, a ROM, and stores the text of, for example, reproduction information such as time information and operation information (e.g., play, rewind, fast forward, camera angle, etc.).

As further shown, a data extracting part 233 receives the bit stream output by the VBR buffer 9 from the video decoding part 21, and sends output to the decoder 237. The controller 245 receives the clock data and the character control instructions from the microprocessor 15, and sends output to the timing circuit 235 and the second character memory 247.

The level controller 241 amplifies the character data output by the first and second character memories 239 and 247, and outputs the amplified character data to the mixer 43. As also shown in FIG. 6, the digital OSD unit 125 transfers the bit stream output from the VBR buffer 9 to the audio decoding part 27.

The operation of the digital OSD unit 125 according to the second embodiment will now be described. The data extracting part 233 extracts sub-picture data from the bit stream output by the VBR buffer 9. A decoder 237 decodes the sub-picture data, and the decoded sub-picture data is stored in the first character memory 239.

The controller 245 receives the clock data and character control instructions from the microprocessor 15. The controller 245 converts the character control instructions into memory addresses of reproduction information stored in the second character memory 247, and outputs the memory addresses to the second character memory 247. The controller 245 also generates timing instructions based on the clock data, and outputs the timing instructions to the timing circuit 235. The timing circuit 235 detects the sync signal in the video data of the bit stream output from the VBR buffer 9, and generates a clock signal based on the detected sync signal and the timing instructions received from the controller 245.

In accordance with the clock signal, the first character memory 239 outputs the decoded sub-picture data as the first character data such that a caption and/or menu selection is displayed at a first predetermined position on a display screen. Based on the clock signal and the memory addresses, the second character memory 247 outputs the addressed reproduction information as second character data such that reproduction information is displayed at a position specified by the clock data on the display screen.

The level controller 241 amplifies the character data output from the first and second character memories 239 and 247, and the mixer 43 mixes the amplified character data with the processed video data output from the video decoding part 21 to produce a digital video signal. Also, the bit stream output from the VBR buffer 9 is transferred-to the audio decoding part 27.

Like the first embodiment discussed above with respect to FIG. 6, the number of processing steps is reduced such that the signal-to-noise ratio is improved. Additionally, all processing is performed in the digital domain.

It should be understood that the optical disc reproducing apparatus according to the present invention is not limited to use with DVDs, but can be used with any optical disc recording media.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An optical disc reproducing apparatus, comprising:
   an optical pick-up for reproducing a digital signal from an optical disc, said reproduced digital signal including at least video data and sub-picture data; and
   a processing means for receiving said reproduced digital signal and digitally processing said sub-picture data together with on-screen display (OSD) text data, the OSD text data being obtained from a storage medium other than the optical disc, for generating first character data based on said sub-picture data, for generating second character data based on said OSD text data, and for generating a digital video signal based on said first and second character data and said video data in said reproduced digital signal.

2. The apparatus of claim 1, wherein said processing means comprises:
   a single memory storing said sub-picture data, and storing said OSD text data.

3. The apparatus of claim 1, wherein said processing means comprises:
   a data extractor extracting said sub-picture data from said reproduced digital signal;
   a decoder decoding said sub-picture data;
   a controller receiving character control instructions and a clock signal, generating timing instructions based on said clock signal, and generating memory addresses based on said character control instructions;
   a timing circuit generating said clock signal based on said video data in said reproduced digital signal and said timing instructions; and
   a single memory storing said obtained OSD text data at predetermined addresses, storing said decoded sub-picture data, and outputting said decoded sub-picture data as said first character data based on said clock signal and outputting said obtained OSD text data as said second character data based on said memory addresses and said clock signal.

4. The apparatus of claim 3, wherein said processing means further comprises:

a mixer mixing said video data and said first and second character data to generate said digital video signal.

5. The apparatus of claim 1, wherein said processing means comprises:
a first memory storing said decoded sub-picture data; and
a second memory storing said obtained OSD text data.

6. The apparatus of claim 1, wherein said processing means comprises:
a data extractor extracting said sub-picture data from said reproduced digital signal;
a decoder decoding said sub-picture data;
a controller receiving character control instructions and clock data, generating timing instructions based on said clock data, and generating memory addresses based on said character control instructions;
a timing circuit generating a clock signal based on said video data in said reproduced digital signal and said timing instructions;
a first memory storing said decoded sub-picture data at predetermined addresses, and outputting said decoded sub-picture data as said first character data based said clock signal; and
a second memory storing said OSD text data, and outputting said OSD text data as said second character data based on said memory addresses and said clock signal.

7. The apparatus of claim 6, wherein said processing means further comprises:
a mixer mixing said video data and said first and second character data to generate said digital video signal.

8. The apparatus of claim 1, wherein said processing means comprises:
a video decoder extracting and decoding said video data in said reproduced digital signal;
a graphics circuit storing said obtained OSD text data and said decoded sub-picture data, and outputting said decoded sub-picture data as said first character data and outputting said OSD text data as said second character data; and
a mixer for mixing said decoded video data and said first and second character data to generate said digital video signal.

9. The apparatus of claim 1, further comprising:
a digital-to-analog converter converting said digital video signal into an analog video signal.

10. The apparatus of claim 1, wherein said OSD text data represents reproduction information and said sub-picture data represents at least one of a caption and a menu selection.

11. The apparatus of claim 1, wherein said processing means receives clock data indicative of a display position for said first character data on a display screen, and generates said first character data based on said character control instructions and said clock data.

12. The apparatus of claim 1, wherein the processing means generates the first character data and the second character data simultaneously.

13. An optical disc reproducing apparatus, comprising:
an optical pick-up for reproducing a signal from an optical disc, said reproduced signal including at least video data and sub-picture data;
a data extractor extracting said sub-picture data and video data from said reproduced signal;
a video decoder decoding said video data in said reproduced signal;
a sub-picture decoder decoding said sub-picture data in said reproduced signal;
a controller receiving character control instructions for on-screen display (OSD) text data and clock data, generating timing instructions based on said clock data, and generating memory addresses based on said character control instructions;
a timing circuit generating a clock signal based on said video data in said reproduced digital signal and said timing instructions; and
a graphics control unit storing OSD text data, generating first character data based on said sub-picture data, and generating second character data based on said OSD text data,
wherein said graphics control unit comprises:
a receiving unit receiving the decoded sub-picture data from the sub-picture decoder and said character data control instruction from the controller;
a memory unit storing said OSD text data at predetermined addresses, and storing said decoded sub-picture data; and
a character generation unit outputting said decoded sub-picture data as said first character data based on said clock signal, and outputting said OSD text data as said second character data based on said memory address and said clock signal.

14. The apparatus of claim 13, further comprising:
a signal generator generating a digital video signal based on said first and second character data and said decoded video data.

15. The apparatus of claim 13, wherein said graphics circuit operates in the digital domain.

16. The apparatus of claim 13, further comprising:
a mixer mixing said video data and said first and second character data to generate said digital video signal.

17. The apparatus of claim 13, wherein said memory unit comprises:
a first memory storing said decoded sub-picture data; and
a second memory storing said OSD text data.

18. The apparatus of claim 13, further comprising:
a mixer mixing said video data and said first and second character data to generate said digital video signal.

19. The apparatus of claim 13, wherein said graphics control unit receives clock data indicative of a display position for said first character data on a display screen, and generates said first character data based on said character control instructions and said clock data.

20. An optical disc reproducing method, comprising:
reproducing a digital signal from an optical disc, said reproduced digital signal including at least video data and sub-picture data;
receiving character control instructions for displaying on-screen display (OSD) text data;
generating first and second character data based on said character control instructions and said sub-picture data in said reproduced digital signal, said first character data representing said sub-picture data stored in a single memory unit, and said second character data representing said OSD text data also stored in a single memory unit after being obtained from a storage medium other than the optical disc; and
generating a digital video signal based on said first and second character data and said video data.

21. The method of claim 20, wherein:
said receiving step receives said character control instructions and clock data; and
said generating first and second character data step includes,
extracting said sub-picture data from said reproduced digital signal,
decoding said sub-picture data, generating a clock signal based on said video data in said reproduced digital signal and said clock data, generating memory addresses based on said character control instructions, storing said decoded sub-picture data in said single memory unit, outputting said decoded sub-picture data from said single memory unit as said first character data based on said clock signal, and outputting OSD text data from said single memory unit as said second character data based on said memory addresses and said clock signal.

22. The method of claim 20, wherein said video data and said first and second character data are mixed to generate said digital video signal.

23. The method of claim 20, further comprising:

extracting said video data in said reproduced digital signal;

decoding said video data in said reproduced digital signal; and wherein said generating a digital video signal step generates said digital video signal based on said first and second character data and said decoded video data.

24. The method of claim 20, further comprising:

converting said digital video signal into an analog video signal.

25. The method of claim 20, wherein said OSD text data represents reproduction information and said sub-picture data represents at least one of a caption and a menu selection.

26. The method of claim 20, wherein:

said receiving step receives said character control instructions and said clock data; and said generating first and second character data step generates said first character based on said character control instructions and said clock data.

27. The method of claim 12, wherein the first character data and the second character data are generated simultaneously.

28. An optical disc reproducing apparatus, comprising:

an optical pick-up for reproducing a signal from an optical disc, said reproduced signal including at least video data and sub-picture data; and a processing means for storing on-screen display (OSD) text data and said sub-picture data prior to reproduction of said optical disk in a single memory, for receiving character control instructions for displaying OSD text, for receiving said reproduced signal, for generating, using said single memory, first character data representing OSD text based on said character control instructions, and for generating, using said single memory, second character data based on said sub-picture data in said reproduced signal.

29. An optical disc reproducing apparatus, comprising:

a signal processing unit reading and processing data from an optical disc, and outputting a bit stream signal comprising video data, audio data, and sub-picture text data;

a decoding unit receiving and digitally processing the bit stream signal to output processed data, the decoding unit digitally processing the sub-picture text data together with on-screen display (OSD) text data, the OSD text data being obtained from a storage medium other than the optical disc, the decoding unit comprising:

a video decoding unit receiving the bit stream signal corresponding to the vide data, processing the video data, and outputting processed video data, a digital on-screen display unit receiving the bit stream signal corresponding to the sub-picture text data, digitally processing the sub-picture text data and the OSD text data, and outputting processed text data, and an audio decoding unit receiving the bit stream signal corresponding to the audio data, processing the audio data and outputting processed audio data;

a control unit connected to and controlling both the signal processing unit and the decoding unit; and a signal converting unit receiving and converting the processed data into analog video and audio signals for output, the analog video signal including sub-picture text and OSD text.

30. The apparatus of claim 29, wherein the sub-picture text data digitally processed by the decoding unit includes information for displaying captions and selection menus in a sub-picture display format.

31. The apparatus of claim 29, wherein the OSD text data digitally processed by the decoding unit includes information for displaying time and operation status in an on-screen display format.

32. The apparatus of claim 29, further comprising a mixer receiving and mixing the processed video data with the processed text data, and outputting to the signal converting unit.

33. The apparatus of claim 29, wherein the digital on-screen display unit comprises a data extractor extracting the sub-picture text data from the bit stream signal;

a decoder receiving and decoding the sub-picture text data from the data extractor;

a timing circuit detecting a sync signal in the bit stream signal, and outputting a timing control signal based on the sync signal; and a digital OSD unit controller receiving a first control signal from the control unit to control the timing circuit, and receiving a second control signal from the control unit to output a memory address control signal.

34. The apparatus of claim 33, further comprising:

a single memory storing the decoded sub-picture text data received from the decoder, storing OSD text data indicating the time and operation status of the optical disc reproducing apparatus, and outputting the stored sub-picture text data and the stored OSD text data as processed text data in accordance with the timing control signal from the timing circuit and the memory address control signal from the digital OSD unit controller.

35. The apparatus of claim 33, further comprising:

a first memory storing the decoded sub-picture text data received from the decoder, and outputting the stored sub-picture text data in accordance with the timing control signal from the timing circuit; and a second memory storing OSD text data indicating the time and operation status of the optical disc reproducing apparatus, and outputting the stored OSD text data in accordance with the memory address control signal from the digital OSD unit controller and the timing control signal from the timing circuit.

* * * * *